United States Patent
Feinberg (10) Patent No.: US 6,944,820 B2
(45) Date of Patent: Sep. 13, 2005

(54) ENSURING PROPER RENDERING ORDER OF BIDIRECTIONALLY RENDERED TEXT

(75) Inventor: Yaniv Feinberg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 817 days.

(21) Appl. No.: 09/818,367

(22) Filed: Mar. 27, 2001

(65) Prior Publication Data

US 2002/0143825 A1 Oct. 3, 2002

(51) Int. Cl.$^7$ .............................................. G06F 15/00
(52) U.S. Cl. ...................... 715/526; 715/526; 715/530; 715/536; 715/531; 345/476; 704/1; 704/9
(58) Field of Search ................................ 715/526, 530, 715/529, 531, 536, 2, 8, 9; 704/1, 2, 8, 9; 345/476

(56) References Cited

U.S. PATENT DOCUMENTS

| | | | | |
|---|---|---|---|---|
| 4,203,102 A | * | 5/1980 | Hydes | 345/467 |
| 5,784,069 A | * | 7/1998 | Daniels et al. | 345/467 |
| 5,812,122 A | * | 9/1998 | Ng | 345/703 |
| 6,204,782 B1 | * | 3/2001 | Gonzalez et al. | 341/90 |
| 6,513,002 B1 | * | 1/2003 | Gillam | 704/9 |
| 2002/0143825 A1 | * | 10/2002 | Feinberg | 707/526 |
| 2003/0023590 A1 | * | 1/2003 | Atkin | 707/6 |
| 2003/0110021 A1 | * | 6/2003 | Atkin | 704/1 |
| 2004/0039996 A1 | * | 2/2004 | Flam | 715/536 |

OTHER PUBLICATIONS

Clissman et al., "The UNIverse Project:state–of–the–ar of standards, softwares and systems which will underpin the development. Part1:Z39.50; WWW Integration with X39.50; and Unicode", copyright 1997, p. 1–10.*

*A future direction in standardizing international character codes—with a special reference to ISO/IEC 10646 and Unicode*; K. Kim; Computer Standards and Interfaces (May 1992) v.4, n.3, p. 209–221.

*What?; you mean the whole world doesn't read and write English only?*; Rae D'Orazio Stabosz; Proceedings of the 26$^{th}$ SIGUCCS Conference on User Services, 1998, p. 273–276.

*Hello, world! A guide for transmitting multilingual electronic mail*; Sunny Au; Proceedings of the 23$^{rd}$ ACM SIGUCCS Conference on Winning the Networking Game, 1995, p. 35–39.

*Interlanguage working without tears: blending SML with Java*; Nick Benton and Andrew Kennedy; Proceedings of the Fourth ACM SIGPLAN International Conference on Functional Programming, 1999, p. 126–137.

* cited by examiner

Primary Examiner—Joseph Feild
Assistant Examiner—Thu V. Huynh
(74) Attorney, Agent, or Firm—Merchant & Gould (57) ABSTRACT

A method and system are provided for locating specific text in a selection of text and ensuring that the specific text is rendered in the proper order relative to other text in the selection of text according to the text rendering rules of the language to which that text belongs. Previously typed text belonging to a language, such as Hebrew, requiring text to be rendered according to bi-directional text rendering rules is scanned to detect characters or strings or characters that need to be ordered according to a specific configuration, such as left-to-right reading order. Once such text is detected, that text is marked and rendered or displayed in the specific configuration, for example, left-to-right reading order, regardless of the reading order of the surrounding text.

21 Claims, 9 Drawing Sheets

ENSURING PROPER RENDERING ORDER OF BIDIRECTIONALLY RENDERED TEXT

TECHNICAL FIELD

The present invention relates to ensuring proper reading order of rendered text. More particularly, the present invention relates to detection of and correction of reading order of text rendered in a bi-directionally rendered language environment.

BACKGROUND OF THE INVENTION

Computer software applications such as word processors, data bases and spreadsheets are used throughout the world for input, manipulation, transmission, display, and printing of data in the form of numbers and text in a variety of different languages.

According to the rules of some spoken languages, for example, English, text is written, displayed, printed and read from left-to-right. However, a number of other languages including Arabic languages, such as Arabic and Farsi, for example, read, write, display and print horizontal text from right-to-left. Some spoken languages, such as Hebrew, are rendered bi-directionally. That is, certain portions of such languages are rendered left-to-right while other portions of those languages are rendered right-to-left. For example, according to the rules of the Hebrew language, text is rendered on a computer display or printout in a right-to-left configuration, but numeric formulas are rendered from left-to-right. Such bi-directional text rendering rules create ambiguities that make it difficult for a computer software application, such as a word processor to properly order and display or print the desired text.

Standards exist for prescribing the order of text according to the rules of various spoken languages. One such standard is the Unicode standard. The Unicode standard attempts to assign a number to every letter or other character used in all rendered languages so that computer encoded text and numbers may be transferred from one computer platform to another without the need for different encoding schemes to handle different spoken languages. The Unicode standard prescribes a memory representation order known as logical order, and the Unicode standard prescribes a number of algorithms and rules for determining the proper order for rendering text and numbers, including bi-directional text. In particular, directional formatting codes have been developed for the Unicode standard for influencing the display ordering of bi-directional text. The characters are still interpreted in a logical order, for example, the order in which the characters were input into memory, but the directional formatting codes are used to ensure proper display of the bi-directional text because the display ordering of the bi-directional text depends on the directional properties of the characters in the text.

In the Hebrew language, certain neutral characters such as the hyphen character ("—") create special difficulties for displaying Hebrew text. As discussed above, according to the rules of the Hebrew language, text is rendered in a right-to-left configuration, while numeric formulas are rendered in a left-to-right configuration. For example, the text "I live in the house on the left" rendered according to the rules of the Hebrew language would be rendered in a right-to-left configuration. However, the numeric formula "3–2=1" would be rendered in a left-to-right configuration according to the rules of the Hebrew language.

In order to deal with neutral characters such as hyphens that are not specific to any particular spoken language, the Unicode standard defines neutrals and how they should be rendered. Under one classification known as the European Terminator ("ET"), hyphens or minus signs are rendered according to the same rules as numbers if those neutrals are touched on either side by a number. Some neutral characters, however, are classified as European Separators ("ES") and are rendered according to the same rules for rendering numbers only if they are touched on both sides by numbers. The hyphen or minus sign is classified by the Unicode standard as a European Terminator character. Because text rendered according to the Hebrew language is bi-directional, as discussed above, ambiguities continue to exist in circumstances where text includes a combination of letters, hyphens and numbers, such as the text "I live in house—12."

Some word processors have been developed to utilize the Unicode standard to solve the problem of rendering text in a bi-directional environment, such as Hebrew. In some systems, the hyphen is treated as a number and the numbers and hyphens are marked and treated as if typed on an English keyboard in a Hebrew language environment. That method addresses the problem of rendering numeric formulas in a Hebrew language environment, but does not address the problem of text containing Hebrew letters followed by a hyphen followed by a number such as the exemplary text described above.

Other systems have been developed for following a standard such as the Unicode standard and solving remaining ambiguities caused by bi-directional text, and in particular situations like the hyphen in the Hebrew language, by keeping track of information on the keyboard used to input and save the information. That is, by following a standard such as the Unicode standard and by knowing whether the text was input using a Hebrew configured keyboard or an English configured keyboard, for example, the word processing system can better render the layout of the text according to the rules of the original language, Hebrew in this case. Such systems often require the user to keep track of different keyboard configurations and require the user to toggle between different keyboard settings. Such systems are at best making certain assumptions about the rendering of the text based on the keyboard that was used, and such systems do not solve the problem of properly rendering text input by a previous version of the word processing system or by a separate word processing system that did not contain the functionality of utilizing the Unicode standard and information on the type of keyboard used.

It is with respect to these considerations and others that the present invention has been made.

SUMMARY OF THE INVENTION

In accordance with the present invention, the above and other problems are solved by a method in system for ensuring the proper rendering order of bi-directional text.

More particularly, a text selection is scanned for a portion of the text selection that must be rendered differently than other portions of the text selection according to text rendering rules of the language to which the text selection belongs. The beginning and end of the portion of the text selection is marked, and the portion of the text selection is rendered differently than other portions of the text selection according to the rules of the language to which the text selection belongs.

In another aspect of the invention, a method and system for ensuring the proper reading order of bi-directional text is provided. A text selection is scanned to locate a hyphen character indicating a beginning of a portion of text that may need to be rendered in left-to-right reading order. The text selection is further scanned to locate a second character indicating an end of the portion of text that may need to be rendered in left-to-right reading order. A determination is made as to whether the portion of text must be rendered in left-to-right reading order. If so, that portion of the text selection is rendered in a left-to-right reading order.

Preferably, location of the second character includes a determination of whether the hyphen character is situated such that a first number is immediately adjacent to a first side of the hyphen character, and a second number character is immediately adjacent to a second side of the hyphen character. If a first number is immediately adjacent to a first side of the hyphen character and a second number is immediately adjacent to a second side of the hyphen character, then the position of the second number is marked indicating an end of the portion of text that may need to be rendered in left-to-right reading order. The text thus marked may then be rendered in a left-to-right reading order.

Alternatively, location of the second character includes a determination of whether the hyphen character is situated such that a number follows the hyphen character and the number is immediately adjacent to one side of the hyphen character. If a number does follow the hyphen character and the number is immediately adjacent to one side of the hyphen character, then the position of the number is marked indicating an end of the portion of text that may need to be rendered in left-to-right reading order. As above, the text thus marked may then be rendered in a left-to-right reading order.

The methods may be implemented as a computer process, a computer system or as an article of manufacture such as computer program product or computer readable media. The computer program product may be a computer storage media readable by a computer system and encoding a computer program for instructions for executing a computer process. The computer program product may also be a propagated signal on a carrier readable by a computer system and encoding a computer program of instructions for executing a computer process.

These and other features and advantages, which characterize the current invention, will be apparent from a reading of the following detailed description and a review of the associated drawings. It is to be understood both the foregoing general description and the following detailed description are exemplary only and are not restrictive of the invention, as claimed.

DETAILED DESCRIPTION OF THE INVENTION

In an exemplary embodiment of the present invention, a method and system are provided for locating specific text in a selection of text and ensuring that the specific text is rendered in the proper order relative to other text in the selection of text according to the text rendering rules of the language to which that text belongs. Previously typed text is scanned to detect characters or strings or characters that need to be ordered according to a specific configuration, such as left-to-right reading order. Once such text is detected, that text is marked and rendered or displayed in the specific configuration, for example, left-to-right reading order, regardless of the reading order of the surrounding text. An exemplary embodiment of the present invention may be incorporated in a word processing software application such as Microsoft Word 2000, manufactured by Microsoft Corporation of Redmond, Washington for correctly rendering or displaying text from languages using bi-directional language rules.

Figure 1:
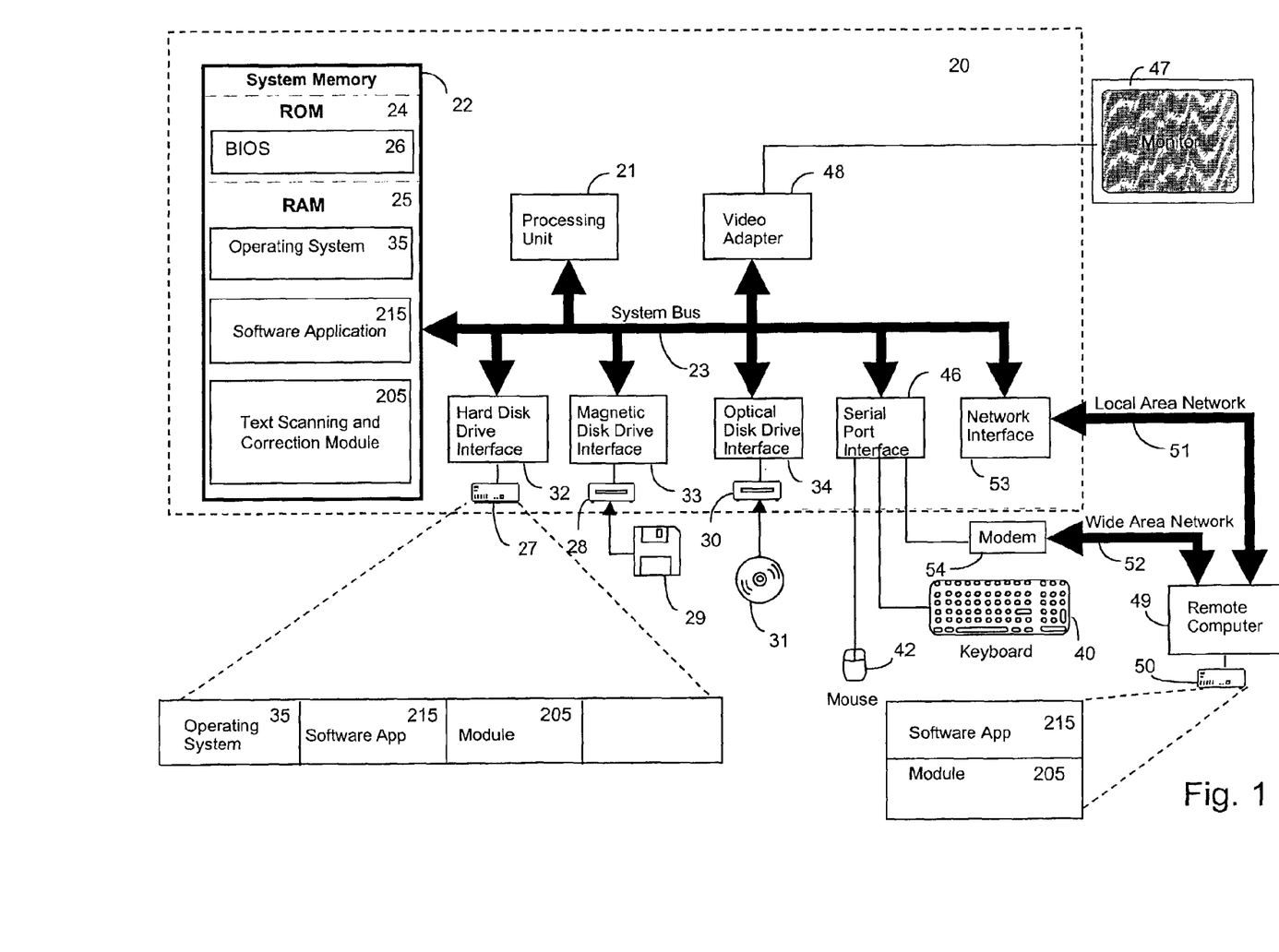
FIG. 1 illustrates a computer system that provides the operating environment for an exemplary embodiment of the present invention.

With reference to FIG. 1, an exemplary operating environment and system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24.

The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35 and a software application 215. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers 49. The remote computer 49 may be a server, a router, a peer device or other common network node, and typically includes many or all of the elements described relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Computing devices, such as personal computer 20, typically include at least some form of computer readable media. Computer readable media can be any available media that can be accessed by personal computer 20. By way of example, and not limitation, computer readable media may comprise computer storage media and communication media. Computer storage media includes volatile and nonvolatile, removable and nonremovable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by personal computer 20.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Computer readable media may also be referred to as computer program product.

As set forth above, according to an exemplary embodiment of the present invention, text is scanned to detect particular text that must be rendered in a specific configuration, for example in a left-to-right reading order versus right-to-left reading order. For example, as briefly discussed above, text input and rendered in the Hebrew language is rendered according to bi-directional text rendering rules. That is, text comprised of letters is rendered in a right-to-left configuration, while text comprised of numeric formulas such as "3–2=1" is rendered in a left-to-right configuration. Accordingly, bi-directionally ordered text such as Hebrew text is scanned to locate text such as the numeric formula "3–2=1" that must be ordered and rendered in a left-to-right configuration.

Figure 2:
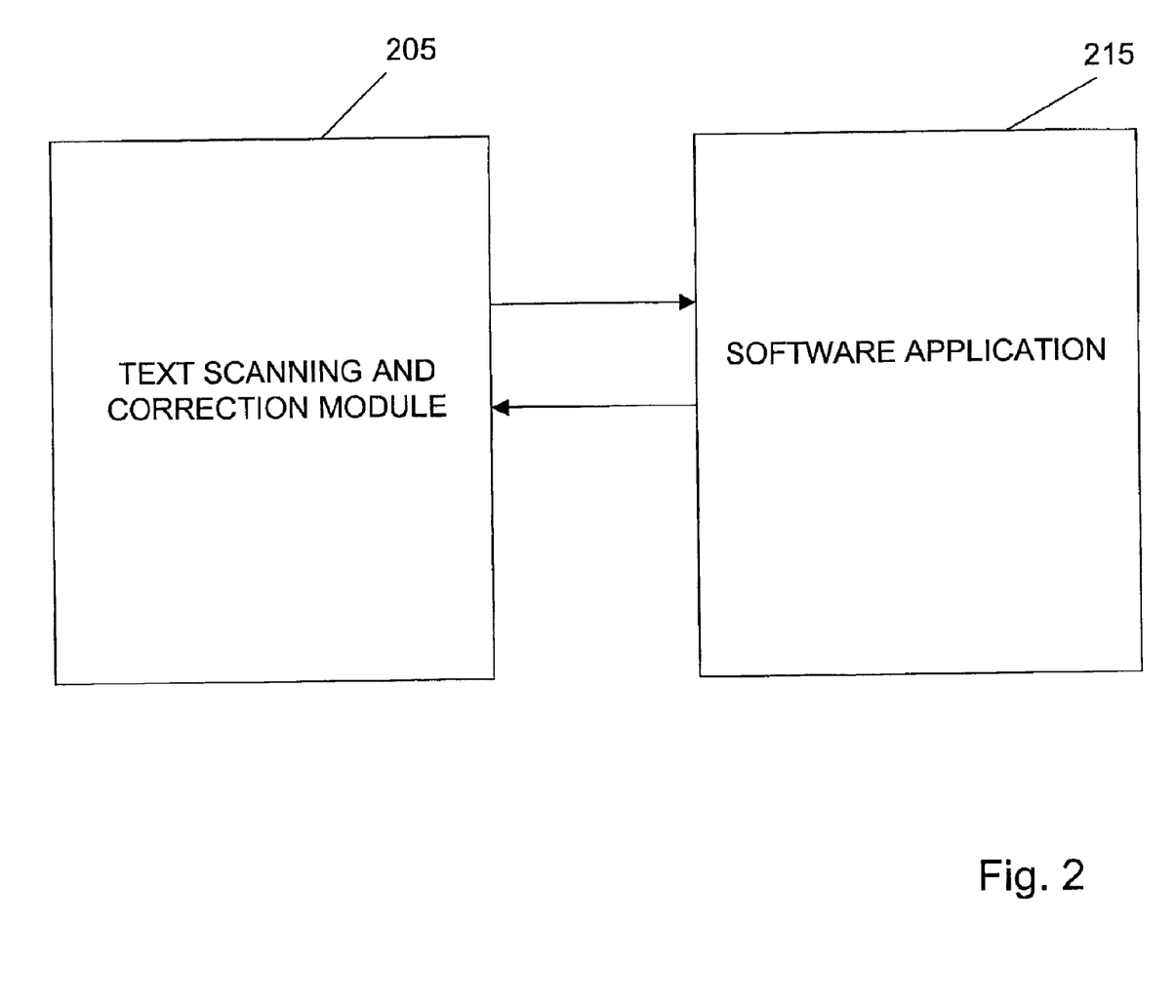
FIG. 2 illustrates interaction between a text scanning and correction module and a software application according to an exemplary embodiment of the present invention.

FIG. 2 illustrates interaction between a text scanning and correction module 205 and a software application 215, such as Microsoft Word 2000. According to an exemplary embodiment, the module 205 is a program module called upon by the software application 215 to scan a text selection or text document for text in a bi-directional text selection for correction. As described in detail below, once a particular text selection such as numeric formula is located in the text selection by the module 205, that portion of the text comprising the numeric formula is marked and is rendered as desired, for example in left-to-right configuration. According to an exemplary embodiment, the user may be prompted at the occurrence of each located character or string of characters to ask the user whether or not the located text should be corrected.

According to a preferred embodiment, the module 205 scans every character of a given document or of a text selection within a document looking for characters that comprise portions of text that must be rendered in a different reading order from the remaining text according to the bi-directional rules of the language to which the text belongs. An example of such characters includes neutrals like dashes, hyphens or minus signs used in the Hebrew language, as described above. It should be understood that the present invention is not limited to operation on the Hebrew language, but its operation regarding the Hebrew language is provided for purposes of explanation by example. The functionality of the present invention is applicable to all bi-directional languages where it is necessary to search for portions of text that must be rendered in a different configuration than other portions of the text.

Following with the exemplary operation of the present invention on text rendered according to the rules of the Hebrew language, the module 205 scans every character looking for a dash "—." When the module 205 locates a dash, the text including the dash is highlighted and the user is given a prompt to ask the user whether the text surrounding the dash should be reversed or flipped into a left-to-right configuration. For example, say the text includes the equation "3–2=1", and upon scanning the text the string "1=2–3" is highlighted. The user is asked via a prompt whether the highlighted text should be corrected. If the user accepts, the string is flipped to correctly read "3–2=1," while the remaining text continues to be configured in a right-to-left configuration according to the rules of Hebrew text rendering. As is understood by those skilled in the art, according to the Hebrew language, non-numeric algebraic type equations, such as "A–B=C", are normally entered using the English alphabet which does not create a bidirectional text problem. However, when non-numeric algebraic type equations are entered using Hebrew variables, the user entering text may enter the text either left-to-right or right-to-left.

If the scan locates a dash with numbers on only one side of the dash, that text also will be highlighted so that the user may determine whether the text should be reversed. For example, text that has been rendered "dollars—12 is balance account My" may be correct if the user intends the right-to-left statement to indicate a negative value of the number "12." On the other hand, text that is rendered "—12 house in live I" may have to be corrected if the hyphen should have been rendered left-to-right between the word "house" and the number "12" so as to read "12-house in live I."

Text selections comprised of a dash surrounded by letters on both sides of the dash are not highlighted because that text need not be corrected. For example, the text "D-apartment in live I" is correct in accordance with a right-to-left reading order and the system need not identify this text to the user for correction. As set forth above, other bi-directional languages may have other characters that trigger the highlighting of text that should be corrected as described above.

Figure 3:
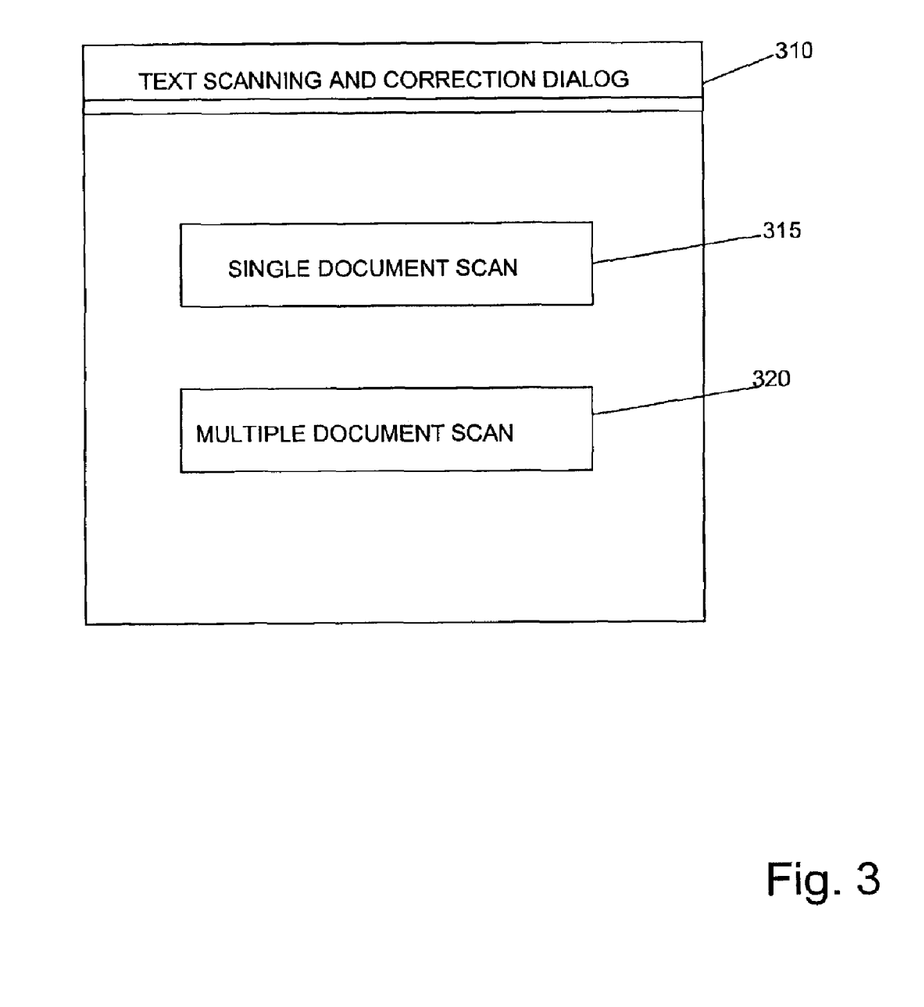
FIG. 3 illustrates a user interface for selecting single document or multiple document text order correction according to an exemplary embodiment of the present invention.

FIG. 3 illustrates a user interface for selecting single document or multiple document text ordering according to an exemplary embodiment of the present invention. According to an exemplary embodiment of the present invention, the user of the module 205 may select a single document for scanning, or the user may select a multi-document scanning process. If the user desires to scan a single document or a selection of text in a single document, the user selects the Single Document Button 315 illustrated in the user interface 310 of FIG. 3. Upon selection of the Single Document Button 315, the user has the option of entering a specific document file name that will then scanned by the module 205. The user then has the option of selecting a particular portion of the text of the document for scanning and text rendering correction or the user has the option to scan and correct the text rendering of the entire selected document.

On the other hand, if the user desires to scan and correct the text rendering of multiple documents containing text created under bi-directional text rendering rules, the user may select the Multiple Document Button 320 of the user interface 310 illustrated in FIG. 3. If the user selects the Multiple Document Button 320, the user is allowed to provide a specified directory of files that will be scanned and corrected according to an exemplary embodiment of the present invention. Under the multiple document scanning and correction process, scanning of the text and correction selected portions of the text is accomplished in like fashion as with the single document process described above. Alternatively, the user may scan and correct documents in a specific directory or in all directories on a particular storage medium such as a hard disk.

The logical operations of the various embodiments of the present invention are implemented (1) as a sequence of computer implemented steps or program modules running on a computer system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to basically as operations, structural devices, acts or modules. It will be recognized by one skilled in the art of these operations, structural devices, acts and modules may be implemented in software, in firmware, and special purpose digital logic, and any combination thereof without deviating from the spirit and scope from the present invention as recited in the claims attached hereto.

FIGS. 4a through 4f illustrate an operational flow of the steps performed by the system and method of the present invention in isolating and correctly ordering text input and rendered according to language utilizing bi-directional text rendering rules. Each of FIGS. 4a through 4f represents a different state of the operation of the described method, including a "Find Begin State," a "Begin Dash State," a "Number With Separator State," an "End Dash State," a "Separator State," and a "Replace Dialog State," respectively.

Figure 4A:
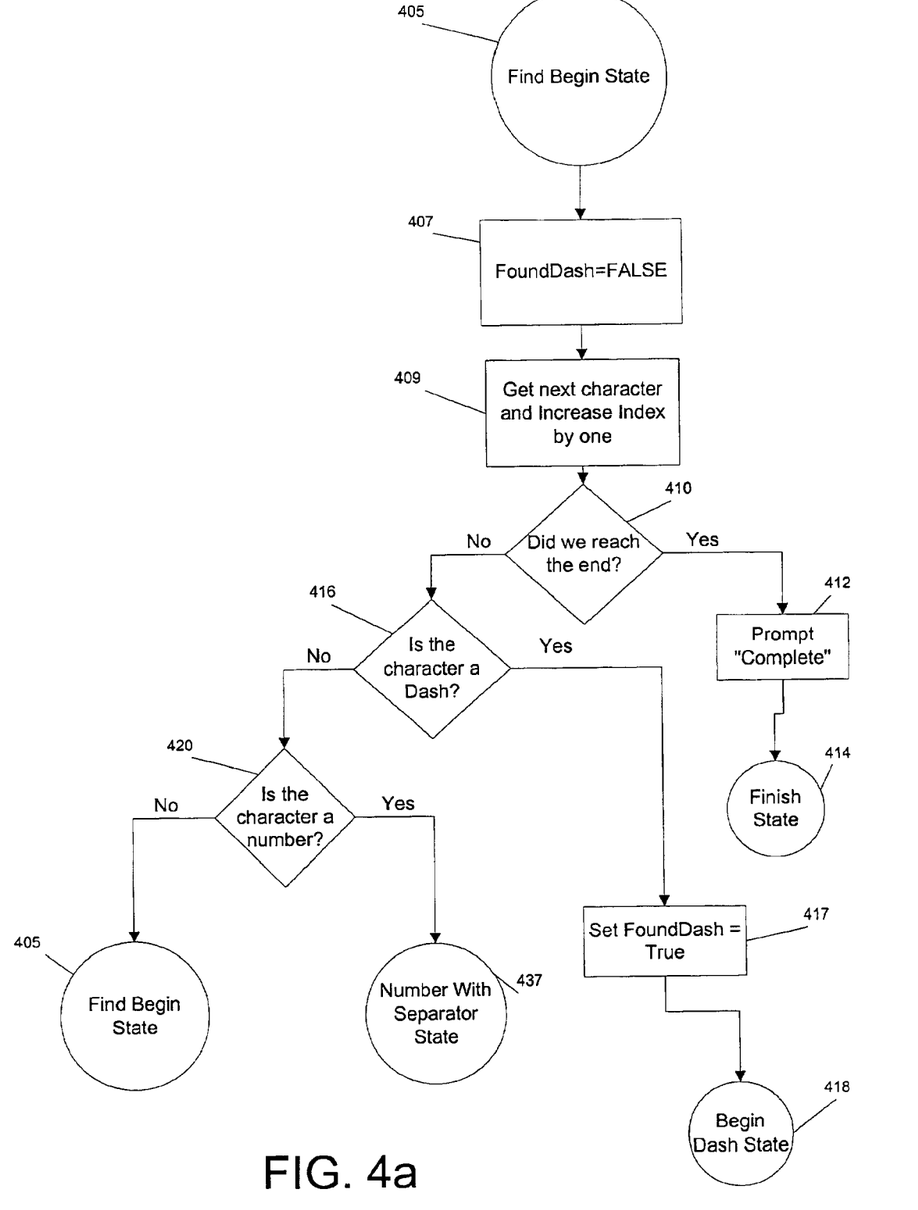
FIGS. 4a through 4f illustrate an operational flow of the steps performed by the system of the present invention in isolating and correctly ordering text input and rendered according to language utilizing bi-directional text rendering rules.
Figure 4B:
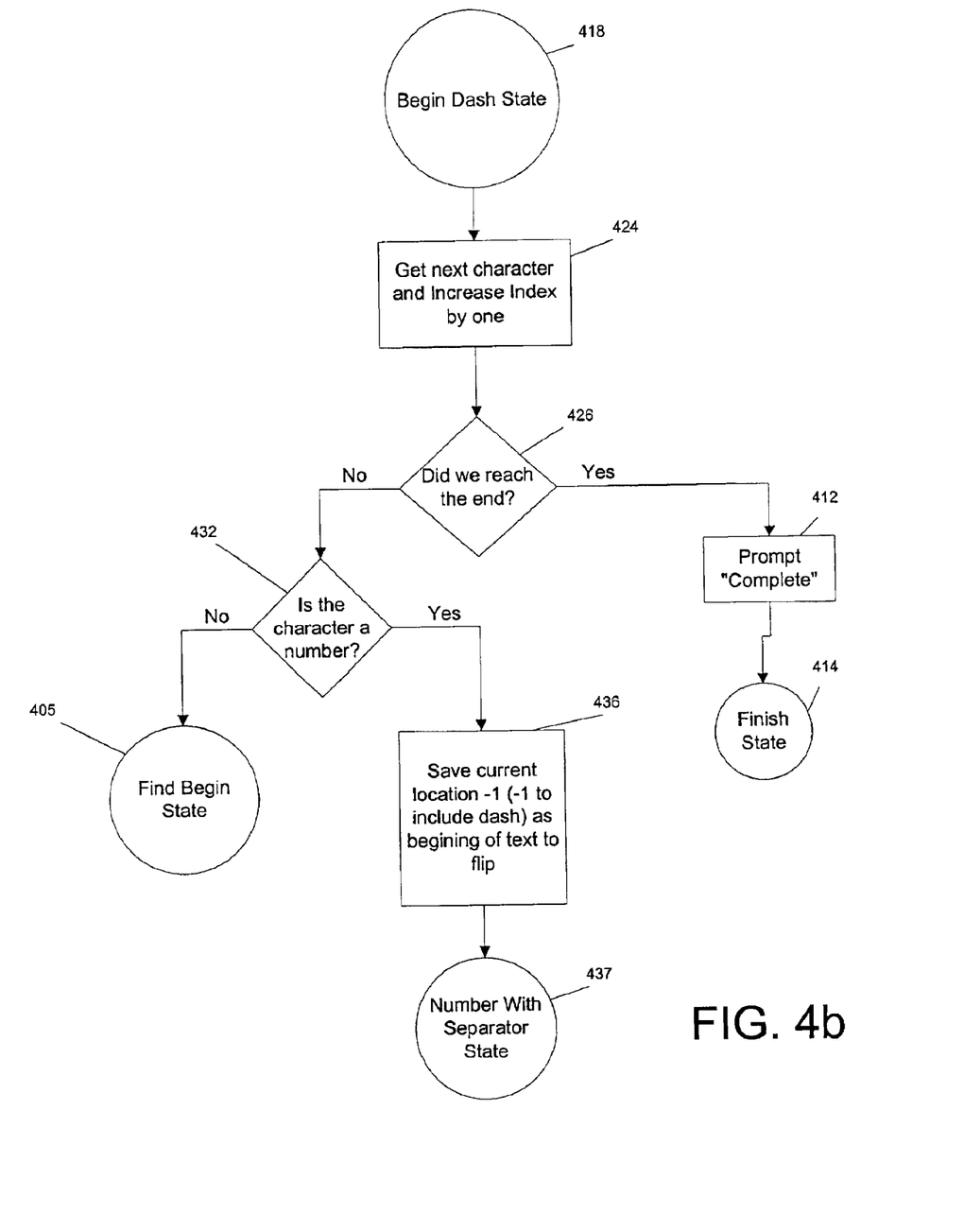

Referring now to FIG. 4a, the method begins at step 405 at the "Find Begin State." At step 405, the module 205 scans a text selection selected by the user under either the single document process, or the user selects a number of documents to be scanned under the multiple document process, each described above. At step 407, the module 205 is initialized as FoundDash=False, meaning no dash has been located yet because the module 205 has not begun scanning characters of the text selection. At step 409, the module 205 obtains the first character of the text selection and increments an index counter for scanned characters from 0 to 1. At step 410, a determination is made whether the character obtained by the module 205 is the last character in the text selection. If at step 410, the end of the text selection has been reached, the method proceeds along the "Yes" branch to step 412, and a "complete" message is prompted to the user. The method then ends at step 414.

If at step 410 a determination is made that the character obtained by the module 205 at step 409 is not the last character in the text selection, the method proceeds along the "No" branch to step 416 and a determination is made as to whether the character obtained by the module 205 at step 409 is a dash, hyphen or minus sign. If the character is a dash, hyphen or minus sign, the method process along the "Yes" branch to step 417. At step 417, the module 205 sets the value of FoundDash equal to "True" indicating a dash has been found.

Figure 4C:
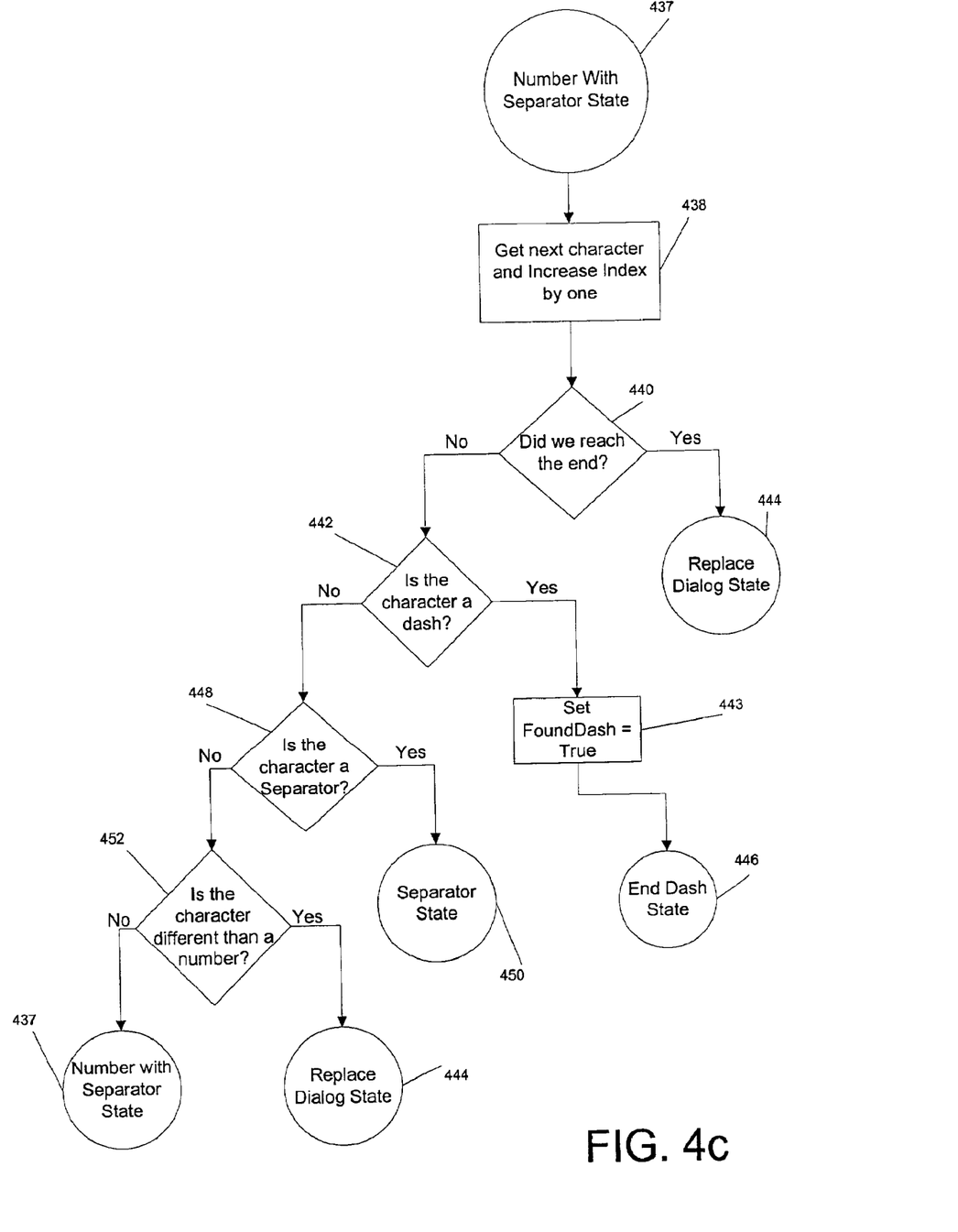
Figure 4D:
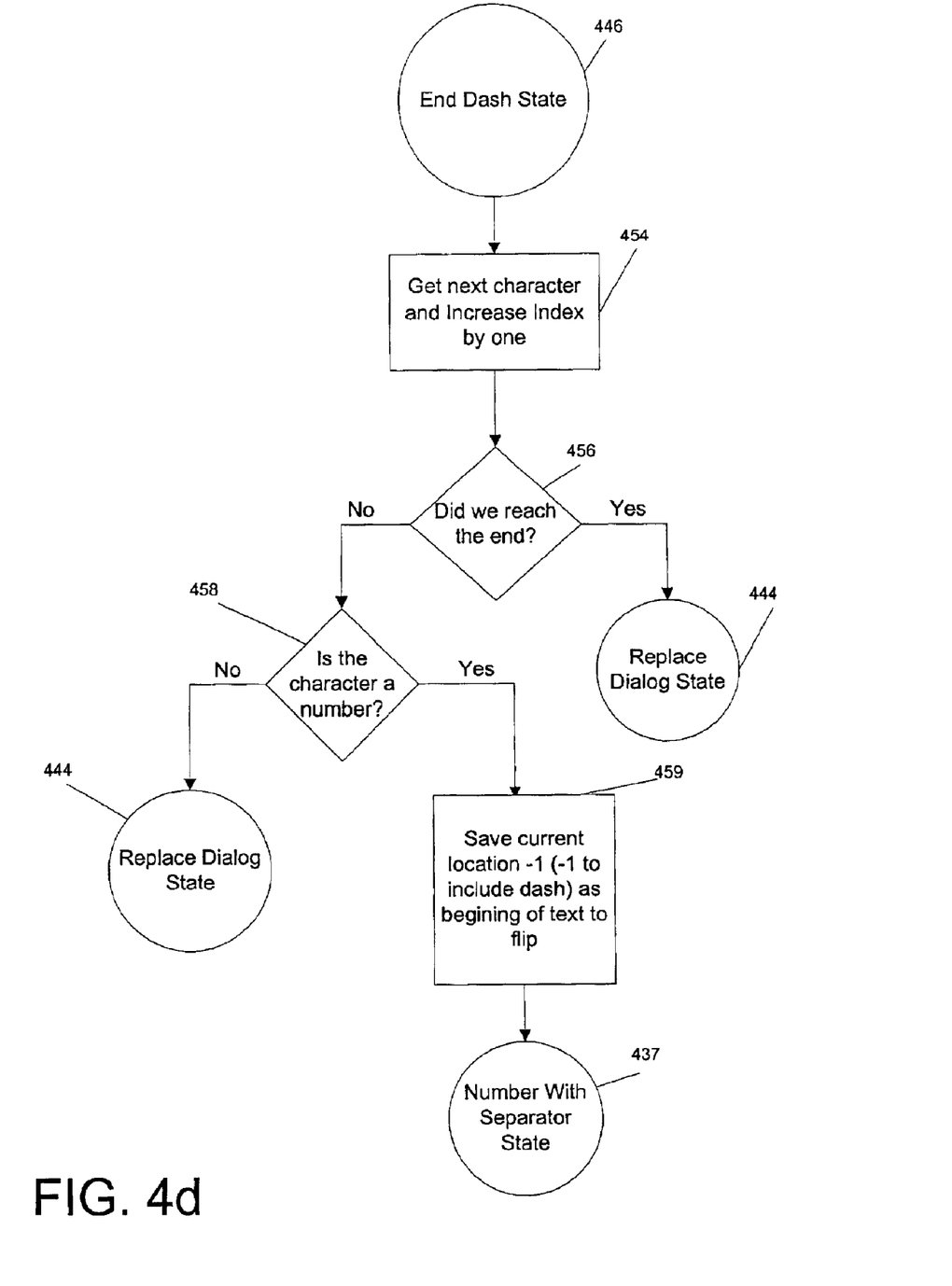
Figure 4E:
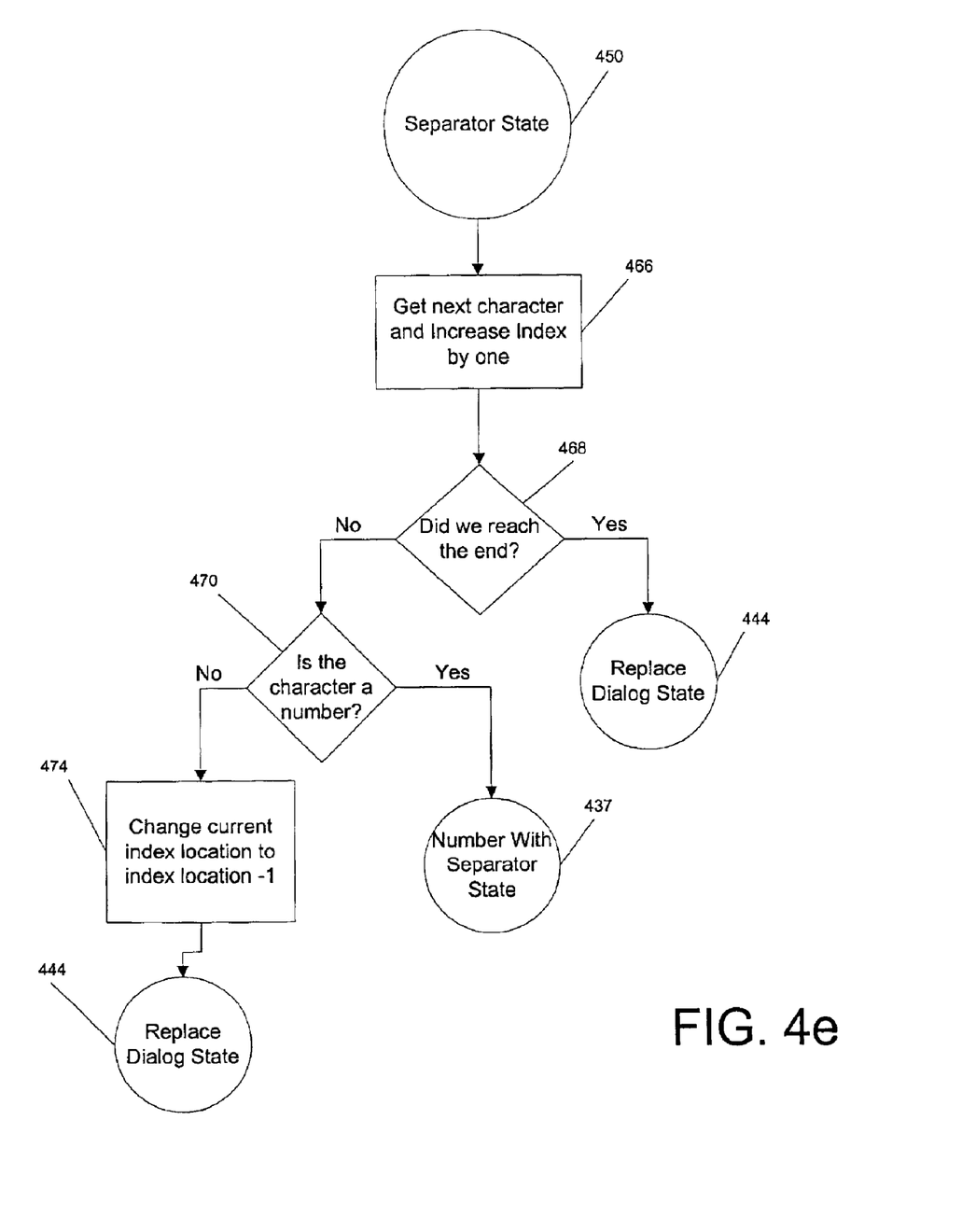
Figure 4F:
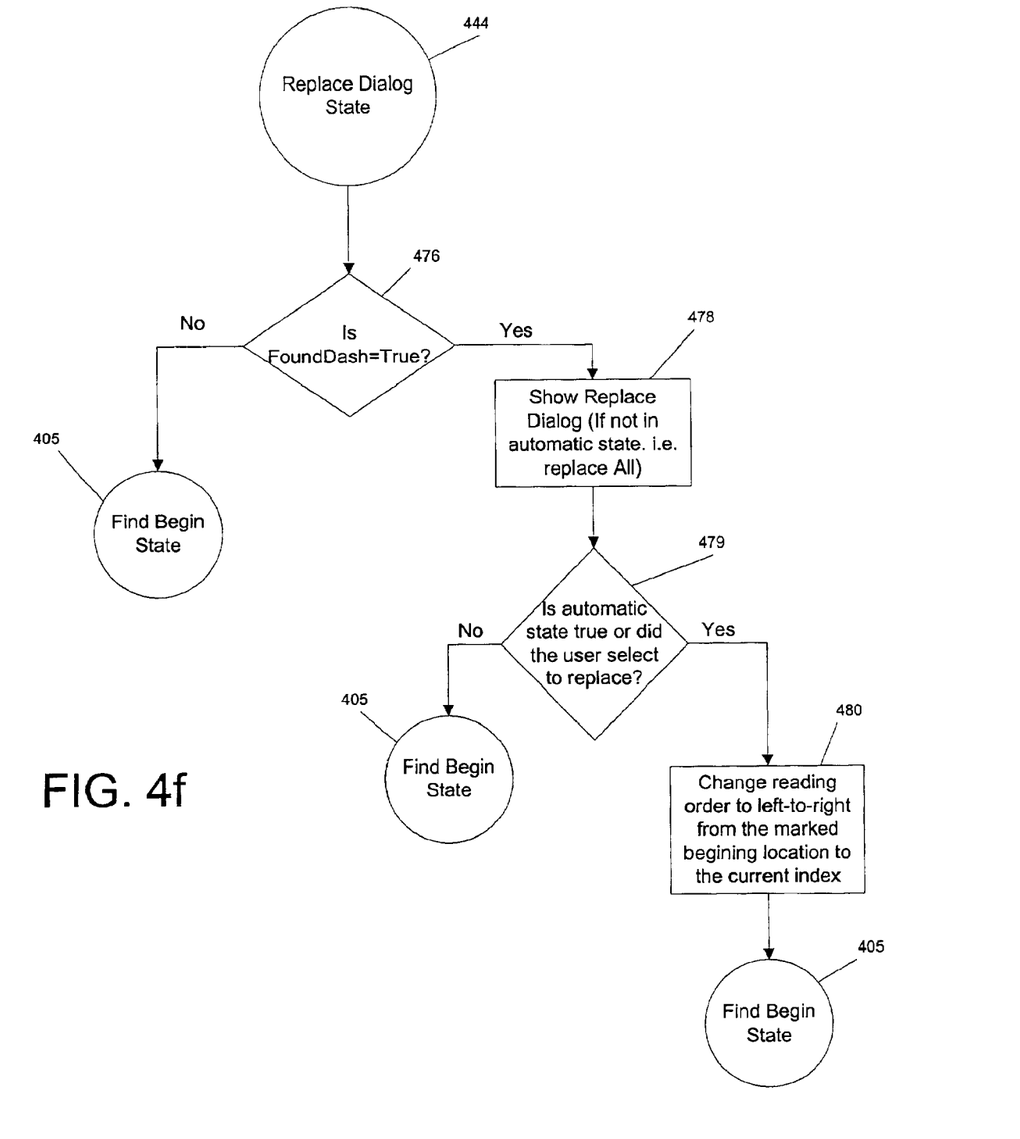

Having found a dash, the method proceeds to the "Begin Dash State" at step 418, FIG. 4f. At step 418, the method proceeds to step 424, and the module 205 obtains the next character in the selected text. At step 426, a determination is again made whether the character is the last character in the text selection. If it is the last character in the text selection then the method ends as described above. If, however, at step 426 the selected character is not the last character in the selected text, the method proceeds along the "No" branch to step 432 and a determination is made as to whether the selected character is a number. According to an exemplary embodiment, a number is defined as a number, forward slash sign or percent sign. It should be understood that the forward slash sign and the percent sign are not defined as numbers according to the Unicode standard, but are defined as numbers for operation of an exemplary embodiment of the present invention. If at step 432, the character obtained by the module 205 of step 424 is not a number, meaning the character is a letter or other non-number character, the method follows the "No" branch to step 434 and returns to the "Find Begin State" at step 405, illustrated in FIG. 4a.

If the selected character is a number, meaning that the text so far scanned by the module 205 is comprised of a dash followed by a number, the method proceeds along the "Yes" branch to step 436. At step 436, the location of the current character less one index position is marked in order to mark the location of the previous character, the dash, and in order to mark the beginning of text that may need to be corrected in accordance with the present invention. After the location of the dash and the number are marked as described at step 436, the method proceeds to the "Number With Separator State" at step 437 and then proceeds to step 438 illustrated in FIG. 4c. At step 438, the next character in the text selection is obtained by the module 205. At step 440, a determination is made as to whether the character obtained in step 438 is the last character in the text selection. If at step 440, the module 205 has reached the end of the text selection, the method proceeds to step 444 to the "Replace Dialog State."

At step 444 the method proceeds to step 476, illustrated in FIG. 4f, and a determination is made whether the value of FoundDash is equal to "True." If the value is "False," the method proceeds back to "Find Begin State," step 405, FIG. 4a. If the value is "True," the method proceeds to step 478, and the Replace Dialog is presented to the user. That is, the text is highlighted from the position of the marked position (step 436) to the current index position to show the user the affected text. Alternatively, the module 205 may be set to automatic correction in which case the highlighted text is flipped to the opposite reading order automatically.

At step 479, a determination is made as to whether the module is set to correct the text automatically. If so, the text is corrected, as described, and the method proceeds back to the "Find Begin State" to begin scanning the remaining text of the document or selection. If the module is not set for automatic correction, the method proceeds to step 480 where the user via a prompt is allowed to decide whether or not the reading order of the highlighted text selection starting from the location marked at step 436 to the current scanning index should be changed. If the user accepts the highlighted text for change, the module 205 causes the software application 215 to render the marked text selection in a left-to-right order. The method then proceeds to step 482 and returns to the "Find Begin State," step 407, FIG. 4a.

Referring back to FIG. 4c, if at step 440, the character obtained by the module 205 at step 438 is not for the end of the text selection being scanned by the module 205, the method proceeds along the "No" branch to step 442. At step 442, a determination is made whether the character obtained by the module 205 at step 438 is a dash, hyphen or minus sign. If so, the method moves along the "Yes" branch to step 443, and the FoundDash value is set to "True". At step 446, the method moves to the "End Dash State" illustrated in FIG. 4d.

At step 454, FIG. 4d, the module 205 obtains the next character in the text selection and increments the character index by 1. At step 456, a determination is made whether the character obtained at step 454 is the end of the text selection. If so, the method proceeds along the "Yes" branch to step 444 to the "Replace Dialog State," and the marked selection is processed as described above.

If at step 456, the determination is made that the character obtained at step 454 is not the last character of the selected text, the method proceeds along the "No" branch to step 458. At step 458 a determination is made whether the character is a number. If the character is not a number, meaning the character is a letter or some other non-number character, the method proceeds along the "No" branch to step 444 and goes to the "Replace Dialog State," and processing begins as discussed above. If at step 458 a determination is made that the character is a number, the method proceeds among the "Yes" branch to step 459.

At step 459, the location of the current character less one index position is marked in order to mark the location of the previous character, the dash, and in order to mark the beginning of text that may need to be corrected in accordance with the present invention. After the location of the dash and the number are marked as described at step 436, the method proceeds to the "Number With Separator State" at step 437, and processing continues as described above.

Referring back to FIG. 4c, if at step 442 a determination is made that the character obtained in step 438 is not a dash, the method then proceeds along the "No" branch to step 448, where a determination is made whether the character is a separator, such as a colon, a period, or a comma. It should be understood that the colon, the period and the comma are not defined as separators according to the Unicode standard, but are defined as separators for operation of an exemplary embodiment of the present invention.

If at step 448, a determination is made that the character obtain in step 438 is a separator, the method proceeds along the "Yes" branch to the "Separator State" at step 450, FIG. 4e. At step 450, the method proceeds to step 466, illustrated in FIG. 4e.

At step 466, the module 205 obtains the next character in the text selection and increments the character index by 1. At step 468 a determination is made whether the character obtained at step 466 is the end of the text selection. If so, the method proceeds along the "Yes" branch to step 444 and returns to the "Replace Dialog State" and processing continues, as described above. However, if at step 468 a determination is made that the character obtained at step 466 is not the end of the text selection, the method moves along the "No" branch to step 470, and a determination is made whether the character obtained at step 466 is a number, forward slash, or percent sign. If so, the method moves along the "Yes" branch to step 437 and returns to the "Number With Separator State," and processing continues as described above.

If at step 470, a determination is made that the characters obtained in step 466 is not a number, forward slash or a percent sign, the method proceeds along the "No" branch to step 474. At step 474, the module 205 changes the current index location to index location less 1 to mark the previous character to begin highlighting the text that may need to be corrected. The method proceeds to step 444 and returns to the "Replace Dialog State."

Referring back to FIG. 4c, the "Number With Separator State," if at step 448 a determination is made that the character obtained a step 438 is not a separator, the method proceeds along the "No" branch to step 452 and a determination is made as to whether the character obtained in step 438 is different than a number, forward slash sign, or percent sign. If yes, the method proceeds to step 444 and returns to the "Replace Dialog State." However, if the step 452 the character obtained in step 438 is a number, the method proceeds along the "No" branch back to step 437 and continues as described above.

Referring back now to FIG. 4a, if at step 416, the character obtained at step 409 is not a dash, hyphen, or minus sign, the method proceeds along the "No" branch to step 420. At step 420, a determination is made as to whether the character obtained the step 409 is a number. If the character obtained at step 409 is a number, the method proceeds along the "Yes" branch to step 437 and the method returns to the "Number With Separator State" illustrated in FIG. 4c, and described above. If, however, at step 420 a determination is made that the character obtained at step 409 is not a number, the method proceeds along the "No" branch back to step 409 where the module 205 obtains the next character in the text selection.

EXAMPLE OPERATION

It is advantageous to describe the logical flow of an exemplary method and system of the present invention by way of example. The following is a description of the processing of a Hebrew text selection containing the numeric formula "3–2=1." As set forth above, under the bi-directional text rendering rules of the Hebrew language, numeric formulas are rendered in a left-to-right configuration while text comprised of letters is rendered in a right-to-left configuration. For purposes of this example, assume the numeric formula "3–2=1" has been rendered incorrectly in a right-to-left configuration to read "1=2–3." Description of the processing of this example in accordance with an exemplary embodiment of the present invention will follow the logical flow described above and illustrated in FIGS. 4a through 4f.

Referring now to FIG. 4a, the method begins at step 405, and the user selects the Single Document Button 315 of the User Interface 310, and the user then selects for scanning a document previously typed and saved in a Hebrew word processing environment. According to an exemplary embodiment, the Module 205 scans the text selection on a character-by-character basis in the order in which the text was entered by the user. Accordingly, in the present example, the numeric formula "3–2=1" will have been entered in the sequence 3, –, 2, =, and 1, and the Module 205 will scan those characters in that order. The Module 205 prevents that formula from being rendered in a right-to-left configuration owing to the fact that it was entered in a Hebrew text environment in which text is rendered right-to-left.

The method proceeds to step 407 and the value of FoundDash is set "False," meaning that no dashes have been found at this point. The method then proceeds to step 409 where the Module 205 obtains the first character of the scanned text selection and increases the character index by one. In accordance with the present example, the first character obtained by the Module 205 is the character "3," and the character index counter is set to one. At step 410, a determination is made whether the Module 205 has reached the end of the text selection. Because the end of the text selection has not been reached, the method proceeds to step 416 and a determination is made whether the first character obtained by the Module 205 is a dash.

In this case, the first character obtained is not a dash, and so the method proceeds to step 420, and a determination is made whether the first character obtained is a number. According to this example, the first character obtained is the number "3", and accordingly, the method proceeds along the "Yes" branch to the "Number With Separator State," step 437, FIG. 4c.

At step 437, FIG. 4c, the method proceeds to step 438, and the Module 205 obtains the next character in the text selection, in this case the dash, "—." The character index counter is increased by one to a count index of two. At step 440, a determination is made as to whether the Module 205 has reached the end of the text selection, and the method proceeds along the "No" branch to step 442. At step 442, a determination is made as to whether the character obtained at step 48 is a dash. According to the present example, the character obtained at step 48 is a dash, and the method proceeds along the "Yes" branch to step 443 where the FoundDash value is set to "True," meaning a dash has been found. The method then proceeds to step 446 to the "End Dash State," illustrated at FIG. 4d.

Referring now to FIG. 4d, the method proceeds to step 454, and the Module 205 obtains the next character in the text selection, in this case the number "2." The character index counter is increased by one to a count of three. Because the Module 205 has not reached the text selection, the method proceeds to step 458, and a determination is made as to whether the character obtained at step 454 is a number. According to the present example, the character obtained at step 454 is the number "2," and accordingly, the method proceeds to step 459.

At step 459, the Module 205 saves the current index location minus one as a marking point for the beginning of text that may need to be flipped in order to place the text selection in a left-to-right reading order. According to the present example, the marking point is saved at index count two which includes the position of the dash in the numeric formula "3–2=1." The method then proceeds to the "Number With Separator State," step 437, FIG. 4c.

Referring then to FIG. 4c, the method proceeds to step 438, and the Module 205 obtains the next character and increases the index count by one to a total count of four. In the present example, the character obtained at step 438 is the equal sign, "=." Because the end of the text selection has not been reached, the method proceeds to step 442 where a determination is made as to whether the character obtained in step 438 is a dash. The character obtained at step 438 is not a dash, and therefore, the method proceeds to step 448. At step 448, a determination is made as to whether the character obtained at step 438 is a separator. In the present example, the character obtained in step 438 is an equal sign, or separator, and therefore, the method proceeds along the "Yes" branch to the "Separator State," step 450, FIG. 4e.

Referring to FIG. 4e, the method proceeds to step 466, and the Module 205 obtains the next character in the text selection and increases the index count by one. Accordingly, the next character obtained is the number "1," and the index count is increased to a count of five. At step 468, a determination is made whether the end of the text selection has been reached. Because the end of the text selection has not been reached, the method proceeds along the "No" branch to step 470 and a determination is made as to whether the character obtained in step 466 is a number. Because the character obtained in step 466 is the number "1," the method proceeds along the "Yes" branch back to the "Number With Separator State," step 437, FIG. 4c.

Returning to FIG. 4c, the method proceeds to step 438, and the Module 205 obtains the next character in the text selection. Because there are no characters following the character last obtained by the Module 205, the method proceeds to step 440 where a determination is made that the end of the text selection has been reached. Accordingly, the method proceeds along the "Yes" branch to the "Replace Dialog State," step 444, FIG. 4f.

The method proceeds to step 476 where a determination is made as to whether the FoundDash value is set to "True." According to the present example, the FoundDash value was set to "True" at step 417. Accordingly, the method proceeds along the "Yes" branch to step 478 where the text "3–2=1" is highlighted to the user, and the user is asked whether the highlighted text should be flipped to left-to-right reading order. At step 479, a determination is made as to whether Module 205 has been set to automatically correct the highlighted text selection.

According to the present example, the user has not selected automatic correction, but the user accepts the highlighted text as text that should be flipped to the left-to-right reading order. Accordingly, at step 480, the text beginning with the marked location of the "dash" at index two through the end of the numeric equation to the character "1" at index location five is flipped to the other side of the character "3." Accordingly, the numeric formula is rendered in a left-to-right configuration to read "3–2=1" in accordance with the bi-directional text rendering rules of the Hebrew language.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein, it is intended be considered as exemplary only, with a true scope and spirit of the invention being indicated by the following claims.

What is claimed is:

1. A computer implemented method of ensuring the proper reading order of bi-directional text, comprising the steps of:

scanning a text selection;
locating a hyphen character indicating a beginning of a portion of text that may need to be rendered in left-to-right reading order;
locating a second character indicating an end of the portion of text that may need to be rendered in left-to-right reading order, including
  determining whether the hyphen character is situated such that a first number is immediately adjacent to a first side of the hyphen character, and a second number character is immediately adjacent to a second side of the hyphen character, and
  if a first number is immediately adjacent to a first side of the hyphen character and a second number is immediately adjacent to a second side of the hyphen character, then
  marking a position of the second number indicating an end of the portion of text that may need to be rendered in left-to-right reading order;
determining whether the portion of text must be rendered in left-to-right reading order; and
rendering the portion of text in left-to-right reading order.

2. The method of claim 1, whereby the step of scanning a text selection, includes
scanning the text selection character by character.

3. The method of claim 1, whereby the text selection is an entire document, and whereby the step of scanning a text selection, includes
scanning the entire document character by character.

4. The method of claim 1, whereby the text selection is a plurality of documents, and whereby the step of scanning a text selection, includes
scanning the plurality of documents character by character.

5. A computer implemented method of ensuring the proper reading order of bi-directional text, comprising the steps of:
scanning a text selection;
locating a hyphen character indicating a beginning of a portion of text that may need to be rendered in left-to-right reading order;
locating a second character indicating an end of the portion of text that may need to be rendered in left-to-right reading order, including
  determining whether the hyphen character is situated such that a number follows the hyphen character and the number is immediately adjacent to one side of the hyphen characters, and
  if a number does follow the hyphen character and the number is immediately adjacent to one side of the hyphen character, then
  marking a position of the number indicating an end of the portion of text that may need to be rendered in left-to-right reading order;
determining whether the portion of text must be rendered in left-to-riaht reading order; and
rendering the portion of text in left-to-right reading order.

6. The method of claim 5, whereby the step of scanning a text selection, includes
scanning the text selection character by character.

7. The method of claim 5, whereby the text selection is an entire document, and whereby the step of scanning a text selection, includes
scanning the entire document character by character.

8. A computer implemented method of ensuring the proper reading order of bi-directional text, comprising the steps of:

scanning a text selection;
locating a hyphen character indicating a beginning of a portion of text that may need to be rendered in left-to-right reading order;
marking a position of the hyphen character;
determining whether the hyphen character is situated such that a first number is immediately adjacent to a first side of the hyphen character and a second number character is immediately adjacent to a second side of the hyphen character;
if a first number is immediately adjacent to a first side of the hyphen character and a second number is immediately adjacent to a second side of the hyphen character, then
marking a position of the second number indicating an end of the portion of text that may need to be rendered in left-to-right reading order;
determining whether the portion of text that may need to be rendered in left-to-right reading order must be rendered in left-to-right reading order; and
rendering the portion of text in left-to-right reading order such that the order of the portion is the second number, followed by the hyphen character, and followed by the first number.

9. A computer implemented method of ensuring the proper reading order of bi-directional text, comprising the steps of:
scanning a text selection;
locating a hyphen character indicating a beginning of a portion of text that may need to be rendered in left-to-right reading order;
marking a position of the hyphen character;
determining whether the hyphen character is situated such that a number follows the hyphen character and the number is immediately adjacent to one side of the hyphen character;
if a number does follow the hyphen character and the number is immediately adjacent to one side of the hyphen character, then
marking a position of the number indicating an end of the portion of text that may need to be rendered in left-to-right reading order;
determining whether the portion of text that may need to be rendered in left-to-right reading order must be rendered in left-to-right reading order; and
rendering the portion of text in left-to-right reading order such that the order of the portion is the number followed by the hyphen character.

10. A computer storage media having stored thereon computer-executable instructions which when executed by a computer perform the steps of:
scanning a text selection;
locating a hyphen character indicating a beginning of a portion of text that may need to be rendered in left-to-right reading order;
locating a second character indicating an end of the portion of text that may need to be rendered in left-to-right reading order, including
  determining whether the hyphen character is situated such that a first number is immediately adjacent to a first side of the hyphen character and a second number character is immediately adjacent to a second side of the hyphen character, and
  if a first number is immediately adjacent to a first side of the hyphen character and a second number is immediately adjacent to a second side of the hyphen character, then marking a position of the second number indicating an end of the portion of text that may need to be rendered in left-to-right reading order;

determining whether the portion of text must be rendered in left-to-right reading order; and rendering the portion of text in left-to-right reading order.

11. The method of claim 10, whereby the step of scanning a text selection, includes scanning the text selection character by character.

12. The method of claim 10, whereby the text selection is an entire document, and whereby the step of scanning a text selection, includes scanning the entire document character by character.

13. A computer storage media having stored thereon computer-executable instructions which when executed by a computer perform the steps of:

scanning a text selection;

locating a hyphen character indicating a beginning of a portion of text that may need to be rendered in left-to-right reading order;

locating a second character indicating an end of the portion of text that may need to be rendered in left-to-right reading order, including determining whether the hyphen character is situated such that a number follows the hyphen character and the number is immediately adjacent to one side of the hyphen character, and if a number does follow the hyphen character and the number is immediately adjacent to one side of the hyphen character, then marking a position of the number indicating an end of the portion of text that may need to be rendered in left-to-right reading orders;

determining whether the portion of text must be rendered in left-to-right reading order; and rendering the portion of text in left-to-right reading order.

14. The method of claim 13, whereby the step of scanning a text selection, includes scanning the text selection character by character.

15. The method of claim 13, whereby the text selection is a plurality of documents, and whereby the step of scanning a text selection, includes scanning the plurality of documents character by character.

16. A system for ensuring the proper reading order of bi-directional text, comprising a computer program module operative:

to scan a text selection;

to locate a hyphen character indicating a beginning of a portion of text that may need to be rendered in left-to-right reading order;

to locate a second character indicating an end of the portion of text that may need to be rendered in left-to-right reading order, including to determine whether the hyphen character is situated such that a first number is immediately adjacent to a first side of the hyphen character and a second number character is immediately adjacent to a second side of the hyphen character, and if a first number is immediately adjacent to a first side of the hyphen character and a second number is immediately adjacent to a second side of the hyphen character, then to mark a position of the second number indicating an end of the portion of text that may need to be rendered in left-to-right reading order;

to determine whether the portion of text must be rendered in left-to-right reading order; and to render the portion of text in left-to-right reading order.

17. The method of claim 16, whereby the step of scanning a text selection, includes scanning the text selection character by character.

18. The method of claim 16, whereby the text selection is an entire document, and whereby the step of scanning a text selection, includes scanning the entire document character by character.

19. A system for ensuring the proper reading order of bi-directional text, comprising a computer program module operative:

to scan a text selection;

to locate a hyphen character indicating a beginning of a portion of text that may need to be rendered in left-to-right reading order;

to locate a second character indicating an end of the portion of text that may need to be rendered in left-to-right reading order, including to determine whether the hyphen character is situated such that a number follows the hyphen character and the number is immediately adjacent to one side of the hyphen character, and if a number does follow the hyphen character and the number is immediately adjacent to one side of the hyphen character, then to mark a position of the number indicating an end of the portion of text that may need to be rendered in left-to-right reading orders;

to determine whether the portion of text must be rendered in left-to-right reading order; and to render the portion of text in left-to-right reading order.

20. The method of claim 19, whereby the step of scanning a text selection, includes scanning the text selection character by character.

21. The method of claim 19, whereby the text selection is a plurality of documents, and whereby the step of scanning a text selection, includes scanning the plurality of documents character by character.

* * * * *

UNITED STATES PATENT AND TRADEMARK OFFICE
CERTIFICATE OF CORRECTION

PATENT NO. : 6,944,820 B2
APPLICATION NO. : 09/818367
DATED : September 13, 2005
INVENTOR(S) : Yaniv Feinberg It is certified that error appears in the above-identified patent and that said Letters Patent is hereby corrected as shown below:

On the title page, item (56), under "Other Publications", in column 1, line 1, delete "state-of-the-ar" and insert -- state-of-the-art --, therefor.

On the title page, item (56), under "Other Publications", in column 2, line 5, after "What?" delete ";" and insert -- : --, therefor.

In column 5, line 26, delete "nonremovable" and insert -- non–removable --, therefor.

In column 6, line 47, delete "bidirectional" and insert -- bi–directional --, therefor.

In column 13, line 48, in Claim 5, delete "characters" and insert -- character --, therefor.

In column 13, line 56, in Claim 5, delete "left-to-riaht" and insert -- left-to-right --, therefor.

In column 15, line 37, in Claim 13, delete "orders" and insert -- order --, therefor.

In column 16, line 45, in Claim 19, delete "orders" and insert -- order --, therefor.

Signed and Sealed this

Twenty-first Day of July, 2009

JOHN DOLL
*Acting Director of the United States Patent and Trademark Office*